US012669009B2

(12) United States Patent
Merz et al.

(10) Patent No.: US 12,669,009 B2
(45) Date of Patent: Jun. 30, 2026

(54) VEHICLE AND METHOD OF CONTROLLING A POWERED REAR CLOSURE BASED ON TRAILER CONNECTION

(71) Applicant: Ford Global Technologies, LLC, Dearborn, MI (US)

(72) Inventors: Adam Merz, New Boston, MI (US); Ronald M. Lovasz, Allen Park, MI (US); Nicholas Wykoff, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 18/624,842

(22) Filed: Apr. 2, 2024

(65) Prior Publication Data

US 2025/0305346 A1     Oct. 2, 2025

(51) Int. Cl.
*E05F 15/76*        (2015.01)
*B60D 1/62*        (2006.01)
*B60J 5/10*        (2006.01)

(52) U.S. Cl.
CPC .............. *E05F 15/76* (2015.01); *B60D 1/62* (2013.01); *B60J 5/10* (2013.01); *E05Y 2400/40* (2013.01); *E05Y 2900/546* (2013.01)

(58) Field of Classification Search
CPC ......... E05F 15/76; E05F 15/611; E05F 15/73; E05F 15/77; E05F 15/40; B60D 1/62;
(Continued)

(56) References Cited

U.S. PATENT DOCUMENTS 9,580,045 B2     2/2017   Holub et al.
9,701,242 B1     7/2017   Jameson
(Continued)

FOREIGN PATENT DOCUMENTS

CN        110696750 A      1/2020
ES          2298072 A1      5/2008
(Continued)

OTHER PUBLICATIONS

How to operate the AutoSense liftgate. How to Operate the Autosense Liftgate | Vehicle Support | Chevy. (Mar. 4, 2024). https://web.archive.org/web/20240304151443/https://www.chevrolet.com/support/vehicle/storage-doors-windows/autosense-liftgate (Year: 2024).*
(Continued)

*Primary Examiner* — Robert T Nguyen
(74) *Attorney, Agent, or Firm* — Frank Lollo; Price Heneveld LLP

(57)        ABSTRACT

A vehicle having a powered rear closure located at a rear end of the vehicle, actuatable by an actuator between a closed position and an open position, a trailer hitch at the rear end of the vehicle for connecting a trailer to the vehicle, a trailer detection system for detecting the trailer connected to the vehicle, and a controller configured to control the powered rear closure to actuate the powered rear closure to the open position when a user is detected approaching the rear end of the vehicle. The controller further inhibits actuation of the powered rear closure when the trailer is detected connected to the vehicle.

12 Claims, 4 Drawing Sheets

(58) Field of Classification Search
CPC .. B60J 5/10; E05Y 2400/40; E05Y 2900/546;
E05Y 2900/548
See application file for complete search history.

(56) References Cited

U.S. PATENT DOCUMENTS

| | | | |
|---|---|---|---|
| 9,937,953 | B2 | 4/2018 | Lavoie et al. |
| 11,878,559 | B2 | 1/2024 | Ruiz et al. |
| 2009/0219148 | A1 | 9/2009 | Thomas et al. |
| 2019/0359018 | A1 | 11/2019 | Brickley et al. |
| 2022/0186541 | A1* | 6/2022 | Adamczyk ............. B60Q 1/305 |
| 2022/0251893 | A1* | 8/2022 | Komaromi ............... B60D 1/60 |
| 2023/0294465 | A1* | 9/2023 | Vrahoretis ............. B60D 1/246 |
| | | | 296/50 |

FOREIGN PATENT DOCUMENTS

| | | | |
|---|---|---|---|
| WO | 9838053 | A2 | 9/1998 |
| WO | 2013155049 | A1 | 10/2013 |

OTHER PUBLICATIONS

Open AutoSense power liftgate hands-free. Chevrolet. (n.d.). https://
www.chevrolet.com/support/quick-start-guides/autosense-liftgate (Year:
2006).*

* cited by examiner

VEHICLE AND METHOD OF CONTROLLING A POWERED REAR CLOSURE BASED ON TRAILER CONNECTION

FIELD OF THE DISCLOSURE

The present disclosure generally relates to motor vehicles having powered rear closures, and more particularly relates to a motor vehicle that controls the powered rear closure based on a trailer connection.

BACKGROUND OF THE DISCLOSURE

Motor vehicles are commonly equipped with powered rear closures, such as powered liftgates or hatchback doors, for example. Some motor vehicles include an open on approach feature that enables the powered rear closure to be actuated to the open position upon a user approaching the powered rear closure at the rear end of the vehicle. It would be desirable to provide for the enhanced control of the powered rear closure for an open on approach feature, particularly for situations where the motor vehicle is a towing motor vehicle towing a trailer connected to the motor vehicle.

SUMMARY OF THE DISCLOSURE

According to a first aspect of the present disclosure, a vehicle comprising a powered rear closure located at a rear end of the vehicle and actuatable by an actuator between a closed position and an open position, a trailer hitch at the rear end of the vehicle for connecting a trailer to the vehicle, a trailer detection system for detecting the trailer connected to the vehicle, and a controller configured to control the powered rear closure to actuate the powered rear closure to the open position when a user is detected approaching the rear end of the vehicle, wherein the controller further inhibits actuation of the powered rear closure when the trailer is detected connected to the vehicle.

Embodiments of the first aspect of the present disclosure can include any one or a combination of the following features:
- the trailer detection system for detecting the trailer connected to the rear end of the vehicle comprises an electrical trailer connection detector;
- the electrical trailer connection detector detects at least one of a trailer brake signal and a trailer light signal;
- the controller detects the user approaching the rear end of the vehicle based on detection of a remote portable device;
- the remote portable device comprises at least one of a key fob and a phone;
- the powered rear closure comprises a liftgate;
- the controller further inhibits actuation of the powered rear closure to the open position when the trailer is disconnected while the user is detected proximate to the powered rear closure; and
- the controller deactivates the inhibiting of actuation of the powered rear closure based on a user preference.

According to a second aspect of the present disclosure, a motor vehicle comprising a powered rear closure located at a rear end of the motor vehicle and actuatable by an actuator between a closed position and an open position, a trailer hitch at the rear end of the motor vehicle for connecting a trailer to the motor vehicle, a trailer detection system for detecting the trailer connected to the motor vehicle, wherein the trailer detection system comprises an electrical trailer connection detector, and wherein the electrical trailer connection detector detects at least one of a trailer brake signal and a trailer light signal, and a controller configured to control the powered rear closure to actuate the powered rear closure to the open position when a user is detected approaching the rear end of the motor vehicle, wherein the controller further inhibits actuation of the powered rear closure when the trailer is detected connected to the rear end of the motor vehicle.

Embodiments of the second aspect of the present disclosure can include any one or a combination of the following features:
- the controller detects the user approaching the rear end of the motor vehicle based on detection of a remote portable device;
- the remote portable device comprises at least one of a key fob and a phone;
- the powered rear closure comprises a liftgate; and
- the controller further inhibits actuation of the powered rear closure to the open position when the trailer is disconnected while the user is detected proximate to the powered rear closure.

According to yet another aspect of the present disclosure, a method of controlling a powered rear closure on a vehicle includes the steps of detecting a trailer connected to the vehicle, detecting a user approaching a rear end of the vehicle, actuating a power actuator to actuate the powered rear closure to an open position upon detecting the user approaching the rear end of the vehicle when there is no trailer detected connected to the vehicle, and inhibiting the opening of the powered rear closure to the open position when the trailer is detected connected to the vehicle.

Embodiments of the third aspect of the present disclosure can also include the following features:
- the step of detecting the trailer connected to the vehicle comprises detecting connection of an electrical trailer connection;
- the electrical trailer connection is detected based on at least one of a trailer brake signal and a trailer light signal;
- the detection of the user approaching the rear end of the vehicle is based on detection of a remote portable device;
- the remote portable device comprises at least one of a key fob and a phone;
- the powered rear closure comprises a liftgate; and
- the step of inhibiting actuation of the powered rear closure to the open position when the trailer is disconnected while the user is detected proximate to the powered rear closure.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1, 2:
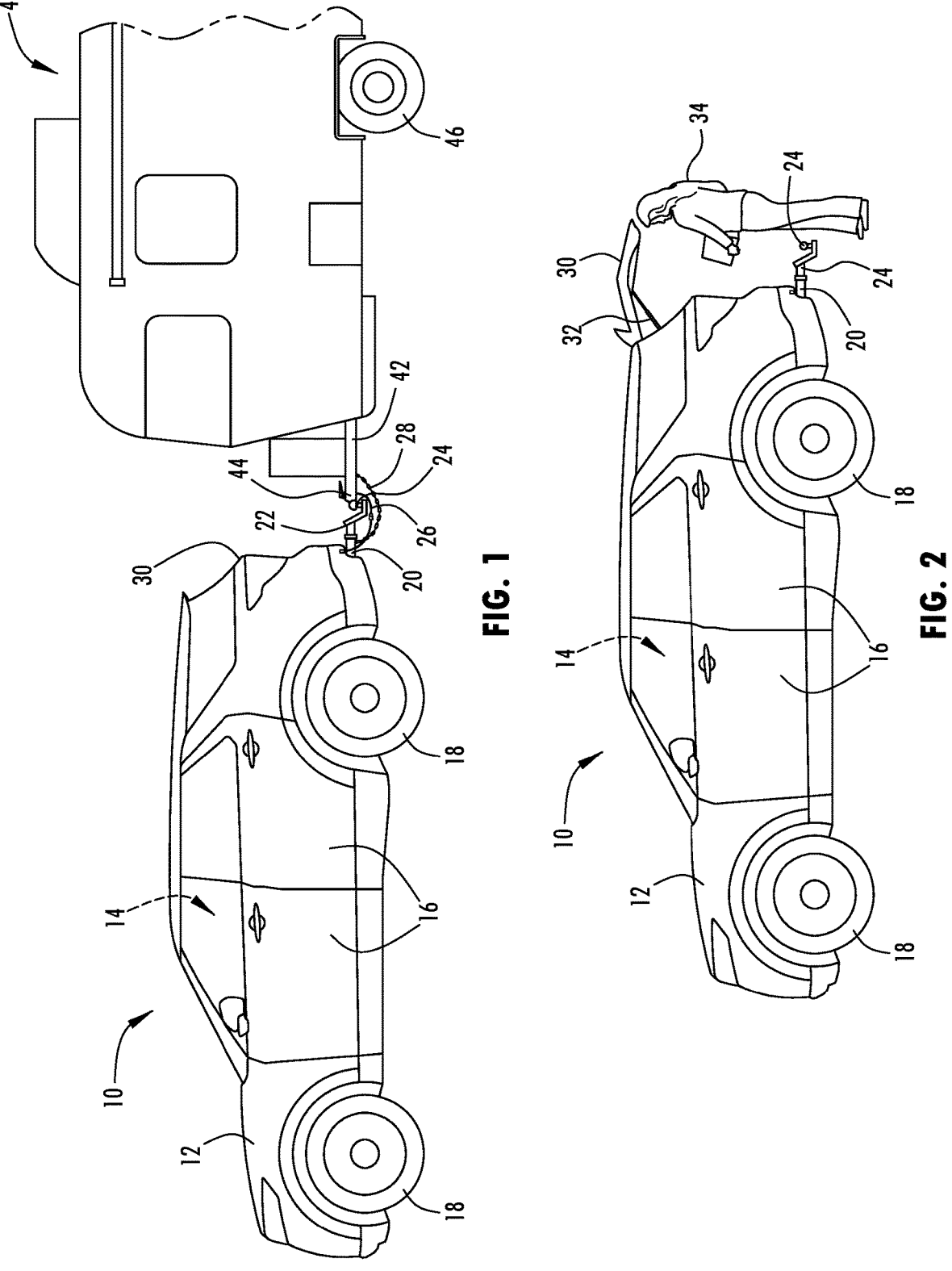
FIG. 1 is a perspective view of a motor vehicle having a powered rear closure and connected to a trailer.
FIG. 2 is a perspective view of the motor vehicle without the trailer and with the powered rear closure in the open position.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and method of controlling a rear powered closure on the vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1 and 2, a motor vehicle 10 is generally illustrated as a towing vehicle configured to tow a trailer 40 connected thereto, according to one example. The motor vehicle 10 is shown in FIG. 1 with the trailer 40 connected to the motor vehicle 10 which may be referred to as a tow vehicle. The motor vehicle 10 is a wheeled automotive vehicle having a plurality of tire and wheel assemblies 18 and a body 12. The body 12 generally defines a cabin interior 14, also referred to as a passenger compartment, and includes side doors 16 on opposite lateral sides. In addition, the body 12 also includes a powered rear closure 30 at the rear end of the motor vehicle 10, shown in one example as a powered liftgate.

The motor vehicle 10 is shown in FIG. 2 with the powered rear closure 30 in the open position, thereby allowing access to the cabin interior 14 from the rear end of the motor vehicle 10. The powered rear closure 30 includes a rear door panel operatively coupled to an actuator such as a liftgate actuator coupled to actuator linkages 32 which may be actuated by an electric motor, for example. The actuator linkages 32 may be actuated to move the powered rear closure 30 to pivot about upper hinges between the generally horizontal open position shown in FIG. 2 and the generally vertical closed position shown in FIG. 1.

The motor vehicle 10 is equipped with an open on approach feature which detects a vehicle user 34 approaching the powered rear closure 30 at the rear end of the motor vehicle 10 to access the rear powered closure door 30, such as to place items within the cabin interior 14 of the motor vehicle 10 or remove items from the cabin interior 14 of the motor vehicle 10. The vehicle user 34, such as the driver of the motor vehicle 10, is shown at the rear end of the motor vehicle 10 in FIG. 2 with the powered rear closure 30 in the open position. It should be appreciated that the motor vehicle 10 is equipped with various sensors and may communicate with one or more remote devices such as a key fob or a phone to detect the vehicle user 34 approaching the rear of the motor vehicle 10. Upon detecting a vehicle user approaching the rear end of the motor vehicle 10 proximate to the powered rear closure 30, such as by detecting the presence of a key fob or a phone carried by the vehicle user 34, the powered rear closure 30 automatically is actuated to move to the open position pursuant to the open on approach feature.

The open on approach feature advantageously allows the vehicle user 34 to access the motor vehicle 10 of the cabin interior 14 at the rear end of the motor vehicle 10, particularly when there is no trailer connected to the motor vehicle 10. When a trailer 40 is connected to the motor vehicle 10, such as is shown in FIG. 1, the open on approach feature is inhibited so as to prevent the powered rear closure 30 from automatically moving from the closed position to the open position. This advantageously prevents uncontrolled interference of the powered rear closure 30 with one or more features of the trailer 40, such as structures or items on the front end of the trailer 40.

As seen in FIG. 1, the motor vehicle 10 has a trailer hitch 20 at the rear end of the motor vehicle 10 configured to receive a hitch plug 22 which has a trailer ball 24 which serves as a trailer connection. The trailer ball 24 is configured to be engaged with and connected to a trailer coupler 44 on a tongue 42 at the forwardmost end of the trailer 40. The trailer coupler 44 engages with the trailer ball 24 to connect the trailer 40 to the motor vehicle 10 and allows the trailer 40 to rotate or articulate relative to the motor vehicle 10. In addition, the trailer 40 may also be connected to the motor vehicle 10 with one or more trailer chains 28. Further, the trailer 40 has an electrical connector 26 which is configured to connect by plugging into an electrical connector on the motor vehicle 10 to provide electrical power such as power for the trailer lights and brakes, for example. The motor vehicle 10 has a trailer detection system which, in one example, detects a connection of the trailer 40 to the motor vehicle 10 via the electrical connector 26 to determine the presence or lack of a trailer 40 connected to the motor vehicle 10.

Figure 3:
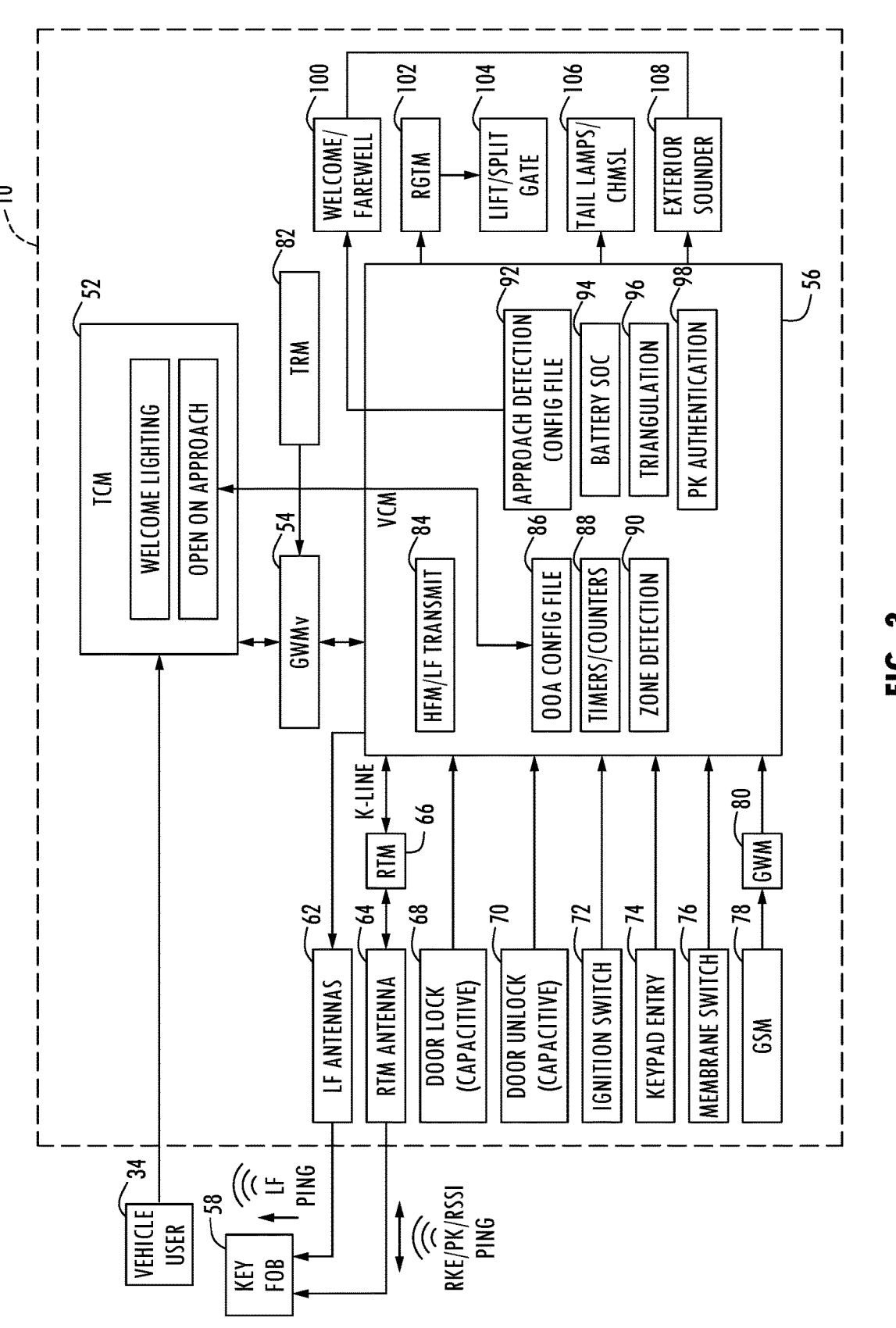
FIG. 3 is a block diagram illustrating controls of the motor vehicle associated with the powered rear closure providing an open on approach feature.

Referring to FIG. 3, the motor vehicle 10 is shown equipped with a trailer control module (TCM) 52 which may communicate or receive inputs from a vehicle user 34. The trailer control module 52 includes a welcome lighting feature and an open on approach feature. The trailer control module 52 communicates with a Gateway module 54 which receives an input from a trailer module (TRM) 82. The Gateway module 54 in turn communicates with a vehicle control module (VCM) 56 on the motor vehicle 10. The vehicle control module 56 may include a body control module, for example. The vehicle control module 56 provides an HFM/LF transmit signal 84, an OOA configuration file 86, timers/counters 88 and zone detection 90. The vehicle control module 56 further includes an approach detection configuration file 92, a battery state of change (SOC) 94 reading, triangulation features 96, and PK authentication features 98. The vehicle control module 56 receives various inputs including signals from an RTM 66 which in turn receives a signal from an RTM antenna 64. In addition, LF antennas 72 communicate with the vehicle control modules 56. Both the LF antennas 62 and RTM antennas 64 provide communication signals with a remote input device, such as a key fob 58. It should be appreciated that the key fob 58, or other remote devices such as phones, may transmit signals including an RKE/PK/RSSI ping signals, for example, which in turn communicate with the motor vehicle 10 and determine the location of the key fob which may include the use of signal triangulation to pinpoint the location of the key fob and presumably the vehicle user carrying the key fob 58.

The vehicle control module 56 further receives inputs from the door lock 68 which may include a capacitive signal and the door unlock 70 which may include a capacitive signal. Further, ignition switch 72 provides a signal to the vehicle control module 56 as well as the keypad entry 74, a memory switch 76, and a Global System for Mobile Communications (GSM) 78 via the GWM 80.

The vehicle control module 56 processes the various inputs and provides outputs including a welcome/farewell signal 100 and a rear gate trunk module (RGTM) signal 102. The vehicle control module 56 further provides a lift/split gate signal 104 which may control the powered rear closure to move between the open and closed positions. Further, the vehicle control module 56 provides output signals to tail lamps/CHMSL lighting 106 and an exterior sounder 108.

Figure 4:
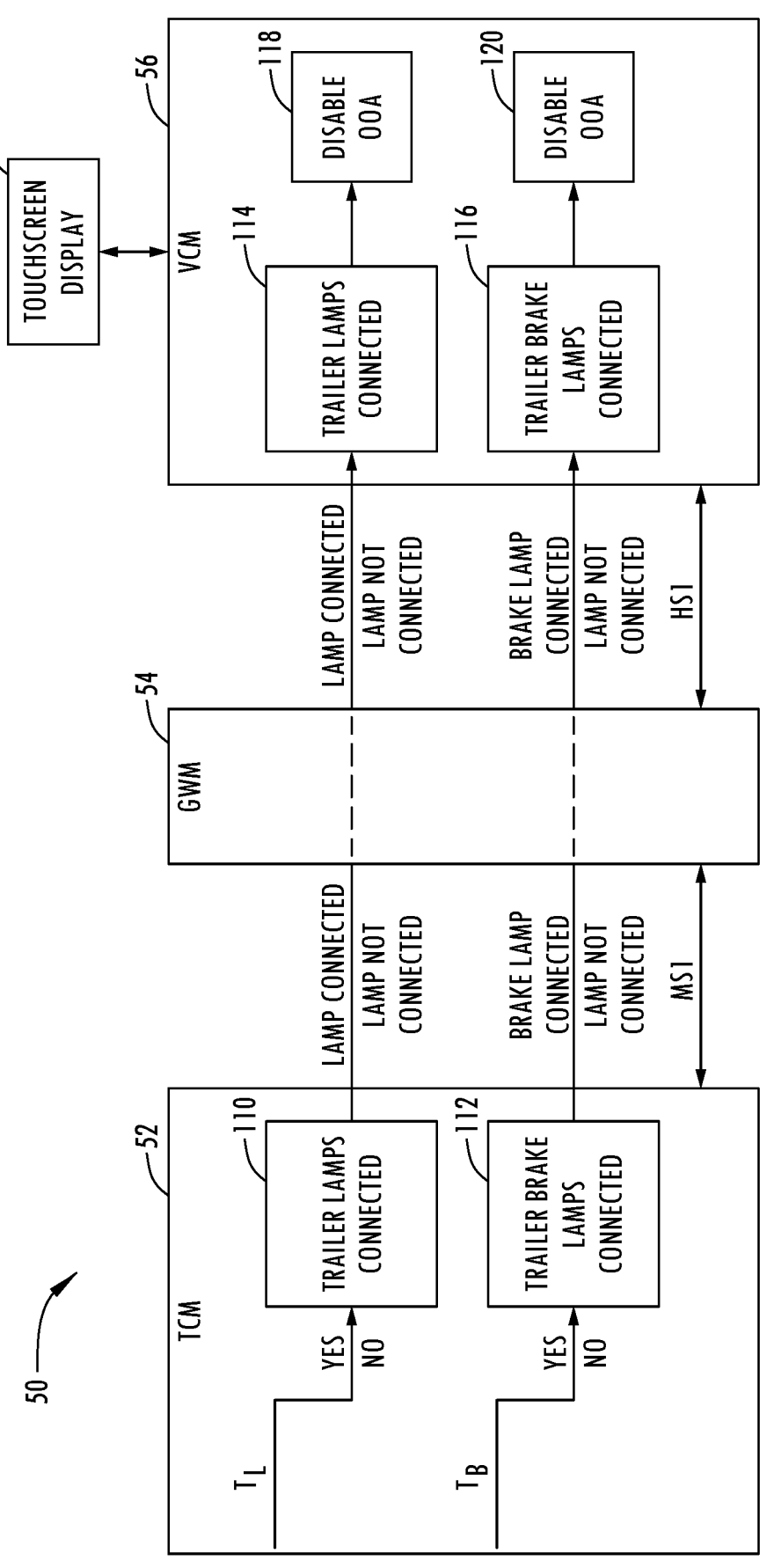
FIG. 4 is a block diagram illustrating the detection of the connection of the trailer to the motor vehicle for use in controlling the powered rear closure.

Referring to FIG. 4, the trailer detection system 50 is illustrated, according to one example, which detects the connection of the trailer 40 to the motor vehicle 10. In this example, the trailer control module 52 communicates with the vehicle control module 56 via the Gateway module 54. The trailer control module 52 receives both the trailer light signal $T_L$ and trailer brake signal $T_B$ which are transmitted via wires in the trailer electrical connector. The trailer lamp signal $T_L$ indicates whether the trailer lamps are electrically coupled to the motor vehicle 10 as reflected in block 110. Similarly, the trailer brake signal $T_B$ reflects whether the trailer brake lamps are electrically coupled to the motor vehicle 10 as reflected in block 112. The electrical state of the trailer lamp signal $T_L$ and trailer brake signal $T_B$ indicates whether the trailer lamps or brakes are connected or not connected to the vehicle and the signals are passed through the Gateway module 54 to the vehicle control module 56. In response to the detected connections, the vehicle control module 56 disables the open on approach feature in block 118 if the trailer lamps are determined to be connected to the motor vehicle 10. Similarly, the vehicle control module 56 disables the open on approach feature in block 120 if the trailer brake lamps are determined to be connected to the motor vehicle 10. Thus, for either a trailer lamp signal or brake signal being detected connected to the motor vehicle 10, the vehicle control module 56 determines that a trailer is connected to the motor vehicle 10 and in response disables the open on approach feature to inhibit automatic opening of the powered rear closure.

It should further be appreciated that the vehicle control module 56 may be in communication with a human machine interface (HMI) in the form of a touch screen display 122, for example, or a portable electronic device such as a phone, according to another example. The touch screen display 122 enables the vehicle user to input preferences for the trailer detection system 50 such as default settings. For example, a vehicle user may determine that it is permissible to allow operation of the open on approach feature for a certain known trailer or a type of trailer which may then be programmed into the vehicle control module 56. As such, the inhibiting of the open on approach feature for certain trailers may be prevented.

Figure 5:
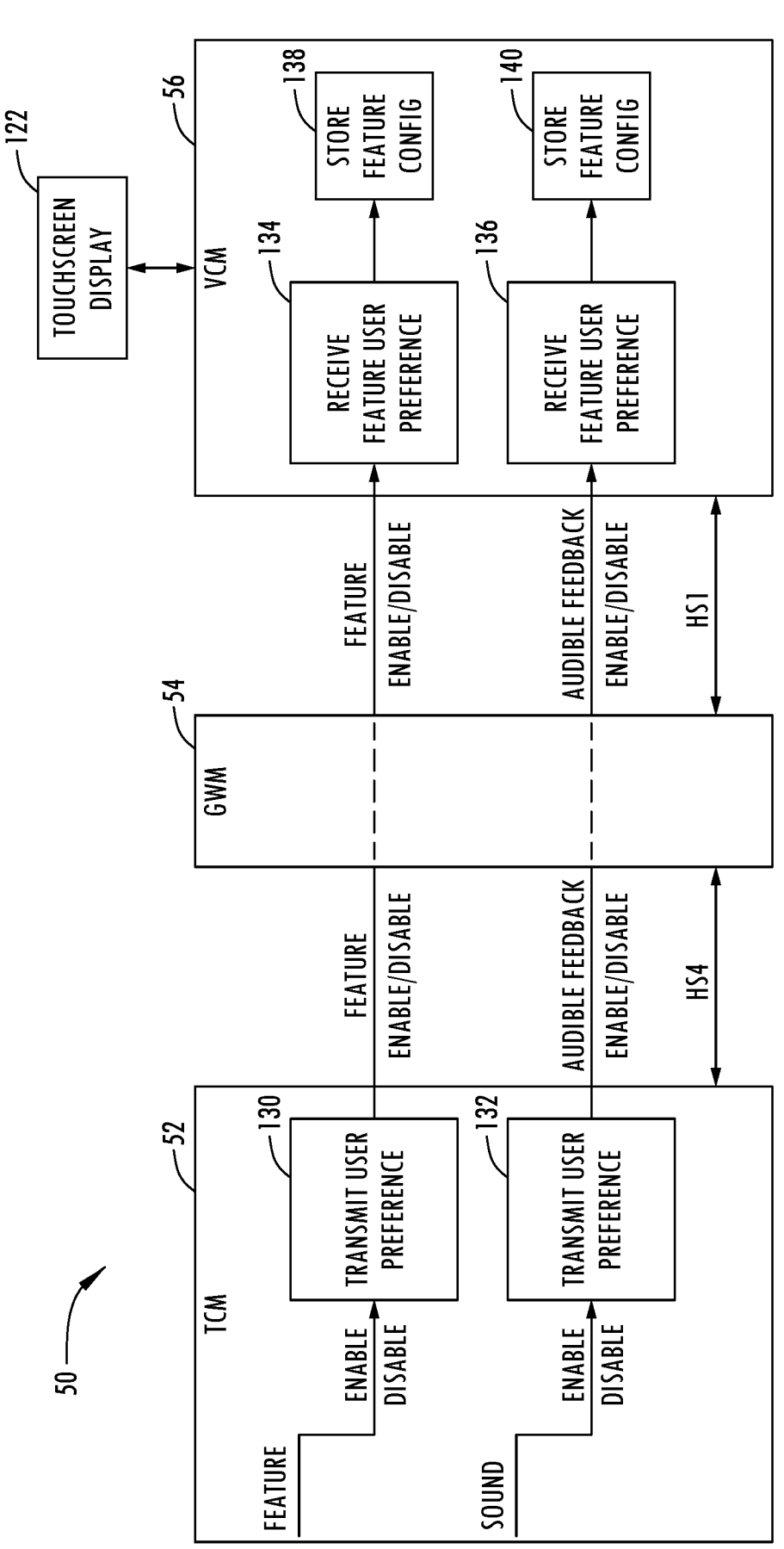
FIG. 5 is a block diagram illustrating the use of user preferences for the open on approach feature.

Referring to FIG. 5, the trailer control module 52 is shown receiving feature and sound signals for transmitting user preferences in blocks 130 and 132. The feature and sound preferences are communicated via the Gateway module 54 to the vehicle control module 56. The vehicle control module 56 receives the feature user preferences in block 134 and receives the feature user preferences in block 136. The received feature user preferences in blocks 132 and 136 are then stored in memory at blocks 138 and 140. It should be appreciated that user preferences may be input via the touch screen display 122 or other user input device within the motor vehicle 10 or may be provided via the trailer control module 52 as shown in one example.

The open on approach feature may be inhibited when a trailer is detected connected via the trailer electrical connector to the motor vehicle 10. In addition, the motor vehicle 10 may detect whether a vehicle user, such as a user equipped with a key fob, remains present at the rear end of the motor vehicle 10 when a trailer electrical connector is disconnected from the motor vehicle 10. When this occurs, the motor vehicle 10 may continue to inhibit operation of the open on approach feature by presuming that the trailer 40 may not have been either physically connected via the trailer coupler and trailer ball connector or the motor vehicle 10 has not moved forward.

The motor vehicle 10 and method of controlling the powered rear closure 30 on the motor vehicle 10 advantageously inhibits operation of an open on approach feature for automatically opening the powered rear closure when a trailer is detected connected via the trailer electrical connector to the motor vehicle 10. This may prevent contact between the powered rear closure of the motor vehicle 10 and the trailer 40 or structures connected to the trailer.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a powered rear closure located at a rear end of the vehicle and actuatable by an actuator between a closed position and an open position;
a trailer hitch at the rear end of the vehicle for connecting a trailer to the vehicle;
a trailer detection system comprising an electrical trailer connection detector for detecting the trailer connected to the trailer hitch at the rear end of the vehicle; and
a controller configured to control the powered rear closure to actuate the powered rear closure to the open position when a user is detected approaching the rear end of the vehicle, wherein the controller further inhibits actuation of the powered rear closure when the trailer is detected connected to the vehicle.

2. The vehicle of claim 1, wherein the electrical trailer connection detector detects at least one of a trailer brake signal and a trailer light signal.

3. The vehicle of claim 1, wherein the controller detects the user approaching the rear end of the vehicle based on detection of a remote portable device.

4. The vehicle of claim 3, wherein the remote portable device comprises at least one of a key fob and a phone.

5. The vehicle of claim 1, wherein the powered rear closure comprises a liftgate.

6. A vehicle comprising:
a powered rear closure located at a rear end of the vehicle and actuatable by an actuator between a closed position and an open position;
a trailer hitch at the rear end of the vehicle for connecting a trailer to the vehicle;
a trailer detection system for detecting the trailer connected to the vehicle; and
a controller configured to control the powered rear closure to actuate the powered rear closure to the open position when a user is detected approaching the rear end of the vehicle, wherein the controller further inhibits actuation of the powered rear closure when the trailer is detected connected to the vehicle, wherein the controller further inhibits actuation of the powered rear closure to the open position when the trailer is disconnected while the user is detected proximate to the powered rear closure.

7. A vehicle comprising:
a powered rear closure located at a rear end of the vehicle and actuatable by an actuator between a closed position and an open position;
a trailer hitch at the rear end of the vehicle for connecting a trailer to the vehicle;
a trailer detection system for detecting the trailer connected to the vehicle; and
a controller configured to control the powered rear closure to actuate the powered rear closure to the open position when a user is detected approaching the rear end of the vehicle, wherein the controller further inhibits actuation of the powered rear closure when the trailer is detected connected to the vehicle, wherein the controller deactivates the inhibiting of actuation of the powered rear closure based on a user preference.

8. A motor vehicle comprising:
a powered rear closure located at a rear end of the motor vehicle and actuatable by an actuator between a closed position and an open position;
a trailer hitch at the rear end of the motor vehicle for connecting a trailer to the motor vehicle;
a trailer detection system for detecting the trailer connected to the motor vehicle, wherein the trailer detection system comprises an electrical trailer connection detector, and wherein the electrical trailer connection detector detects at least one of a trailer brake signal and a trailer light signal; and
a controller configured to control the powered rear closure to actuate the powered rear closure to the open position when a user is detected approaching the rear end of the motor vehicle, wherein the controller further inhibits actuation of the powered rear closure when the trailer is detected connected to the rear end of the motor vehicle.

9. The motor vehicle of claim 8, wherein the controller detects the user approaching the rear end of the motor vehicle based on detection of a remote portable device.

10. The motor vehicle of claim 9, wherein the remote portable device comprises at least one of a key fob and a phone.

11. The motor vehicle of claim 8, wherein the powered rear closure comprises a liftgate.

12. The motor vehicle of claim 8, wherein the controller further inhibits actuation of the powered rear closure to the open position when the trailer is disconnected while the user is detected proximate to the powered rear closure.

* * * * *